US012717832B2

(12) United States Patent
Son

(10) Patent No.: US 12,717,832 B2
(45) Date of Patent: Aug. 25, 2026

(54) APPARATUS AND METHOD FOR SUMMARIZING INFORMATION USING GENERATIVE ARTIFICIAL INTELLIGENCE MODEL

(71) Applicant: KOREA INSTITUTE OF SCIENCE AND TECHNOLOGY, Seoul (KR)

(72) Inventor: Moon Son, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 211 days.

(21) Appl. No.: 18/640,705

(22) Filed: Apr. 19, 2024

(65) Prior Publication Data

US 2024/0354324 A1 Oct. 24, 2024

(30) Foreign Application Priority Data

Apr. 20, 2023 (KR) ........................ 10-2023-0052082

(51) Int. Cl.
*G06F 16/34* (2025.01)
*G06F 16/9535* (2019.01)
*G06T 1/00* (2006.01)

(52) U.S. Cl.
CPC ........ *G06F 16/345* (2019.01); *G06F 16/9535* (2019.01); *G06T 1/0021* (2013.01)

(58) Field of Classification Search
CPC .. G06F 16/9535; G06F 16/345; G06T 1/0021
See application file for complete search history.

(56) References Cited

U.S. PATENT DOCUMENTS

| | | | |
|---|---|---|---|
| 7,912,289 B2 | 3/2011 | Kansal et al. | |
| 8,731,339 B2 | 5/2014 | Chan et al. | |
| 11,769,017 B1 * | 9/2023 | Gray | G06F 40/56 704/9 |
| 2002/0078356 A1 * | 6/2002 | Ezaki | G11B 19/122 713/176 |
| 2020/0356592 A1 * | 11/2020 | Yada | G06F 16/538 |
| 2021/0349685 A1 * | 11/2021 | Kanuganti | G06F 16/434 |
| 2023/0274479 A1 | 8/2023 | Choi et al. | |

(Continued)

FOREIGN PATENT DOCUMENTS

| | | |
|---|---|---|
| KR | 10-2010-0043106 A | 4/2010 |
| KR | 10-2017-0004154 A | 1/2017 |

(Continued)

OTHER PUBLICATIONS

Korean Office Action issued on Sep. 4, 2025 in corresponding Korean Patent Application No. 10-2023-0052082 (6 pages in English and 5 pages in Korean).

(Continued)

*Primary Examiner* — Tadesse Hailu
(74) *Attorney, Agent, or Firm* — NSIP Law

(57) ABSTRACT

Disclosed embodiments are directed to providing an apparatus and method for summarizing information using a generative artificial intelligence model that is capable of generating an answer sentence and an image summarizing and organizing numerous information associated with a user's search term using a pre-trained generative artificial intelligence model, and generating and providing answer content that includes the generated sentence and image.

11 Claims, 7 Drawing Sheets

(56) References Cited

U.S. PATENT DOCUMENTS

| | | | | |
|---|---|---|---|---|
| 2024/0061895 | A1 * | 2/2024 | Bradley | G06F 16/9535 |
| 2024/0256615 | A1 * | 8/2024 | Liu | G06F 16/954 |
| 2024/0378399 | A1 * | 11/2024 | Gandhi | G06F 40/40 |

FOREIGN PATENT DOCUMENTS

| | | | |
|---|---|---|---|
| KR | 10-2019-0013426 | A | 2/2019 |
| KR | 10-2189373 | B1 | 12/2020 |
| KR | 10-2213618 | B1 | 2/2021 |
| KR | 10-2021-0090368 | A | 7/2021 |
| KR | 10-2287407 | B1 | 8/2021 |
| KR | 10-2022-0026647 | A | 3/2022 |
| KR | 10-2471754 | B1 | 11/2022 |

OTHER PUBLICATIONS

OpenAI "ChatGPT can see, hear, and speak" copyrighted 2015-2024. <https://openai.com/chatgpt>.

Holz, et al. "Midjourney" accessed on Apr. 17, 2024.<https://www.midjourney.com>.

Ramesh, et al. "DALL • E: Creating images from text" Jan. 5, 2021. <https://openai.com/research/dall-e>.

* cited by examiner

APPARATUS AND METHOD FOR SUMMARIZING INFORMATION USING GENERATIVE ARTIFICIAL INTELLIGENCE MODEL

DESCRIPTION OF GOVERNMENT-FUNDED RESEARCH AND DEVELOPMENT

This research is conducted under the support of personal basic research (R&D), [Project Name: Optimizing a production process of a renewable energy through electrochemical water treatment using deep learning, Project Serial Number: 1711169564, Project ID Number: 2021R1C1C2005643], Ministry of Science and ICT.

CROSS REFERENCE TO RELATED APPLICATIONS

The present application claims priority to Korean Patent Application No. 10-2023-0052082, filed on Apr. 20, 2023, the entire contents of which is incorporated herein for all purposes by this reference.

BACKGROUND OF THE INVENTION

Field of the Invention

Disclosed embodiments relate to an apparatus and method for summarizing information using a generative artificial intelligence model, and more particularly, to an apparatus and method for summarizing information using a generative artificial intelligence model that is capable of generating answer sentences and images summarizing numerous pieces of information associated with a user's search term using a pre-trained generative artificial intelligence model, and generating and providing answer content that includes the generated sentences and images.

Description of the Related Art

A huge number of people have processed numerous kinds of information in various ways and posted the information on the internet, resulting in an abundance of scattered information on the internet.

Accordingly, when collecting, summarizing, and organizing materials on a topic, conventionally, a user needs to go through numerous news articles, reports, papers, videos, and the like one by one to selectively extract and organize the necessary information, which takes a lot of time and effort.

In addition, while summarizing and organizing the searched information requires expertise, it is impossible for individuals and specific groups of people to have expertise in all information, which makes it very difficult to present summarized information tailored to specific search keywords with high accuracy.

Documents of Related Art (Patent Document 1) Korean Patent No. 10-2189373 (Dec. 11, 2020)

SUMMARY OF THE INVENTION

Disclosed embodiments are directed to solving the conventional problems as described above, and an object of the disclosed embodiments is to provide an apparatus and method for summarizing information using a generative artificial intelligence model that is capable of generating an answer sentence and an image summarizing and organizing numerous information associated with a user's search term using a pre-trained generative artificial intelligence model, and generating and providing answer content that includes the generated sentence and image.

In order to achieve the object described above, according to the disclosed embodiment, there is provided an apparatus for summarizing information using a generative artificial intelligence model, the apparatus may include: one or more processors; and a memory provided for storing instructions executed by the one or more processors, in which the one or more processors may be configured to: generate an answer sentence on a search term input from a user, using a first generative artificial intelligence model pre-trained to summarize and organize information that the user desires on the basis of information existing on the Internet; generate an answer image based on at least one of the search term or the answer sentence using a second generative artificial intelligence model pre-trained to generate an image corresponding to an input sentence; and generate answer content including the answer sentence and the answer image.

The one or more processors may be configured to manage feedback information by the user on at least one of the answer sentence, the answer image, or the answer content.

The one or more processors may be configured to score the feedback information, classify the scored feedback as a personal preference of the user, and reflect the scored feedback in generating at least one of the answer sentence, the answer image, or the answer content.

The one or more processors may be configured to manage the feedback information in synchronization with a search term pattern of the user.

The one or more processors may be configured to recommend one of plurality of pre-stored feedback information synchronized with a search term pattern similar to the search term pattern of the user.

The one or more processors may be configured to insert a watermark into the answer content indicating that the answer content was generated by the first generative artificial intelligence model and/or the second generative artificial intelligence model.

According to one embodiment, there is provided a method of summarizing information using a generative artificial intelligence model performed by an apparatus provided with one or more processors, and a memory storing instructions executed by the one or more processors, the method may include: generating an answer sentence on a search term input from a user, using a first generative artificial intelligence model pre-trained to summarize and organize information that the user desires on the basis of information existing on the Internet; generating an answer image based on at least one of the search term or the answer sentence using a second generative artificial intelligence model pre-trained to generate an image corresponding to an input sentence; and generating answer content including the answer sentence and the answer image.

The method may further include: managing feedback information input from the user on at least one of the answer sentence, the answer image, or the answer content.

The managing of the feedback information may include: scoring the feedback information and classifying and storing the scored feedback as a personal preference of the user; and reflecting the scored feedback in generating at least one of the answer sentence, the answer image, or the answer content.

The managing of the feedback information may include managing the feedback information in synchronization with a search term pattern of the user.

The method may further include: recommending one of a plurality of pre-stored feedback information synchronized to a search term pattern similar to the search term pattern of the user, the generating an answer sentence, the generating answer image, and the generating an answer content may generate the answer sentence, the answer image and the answer content based on the recommended feedback information, respectively.

The method may further include: inserting a watermark indicating that the answer content was generated by the first generative artificial intelligence model and/or the second generative artificial intelligence model.

A non-transitory computer-readable recording medium, according to one embodiment, on which a computer program is recorded may be configured to perform the method of summarizing information using a generative artificial intelligence model as described above.

Other specific details of the embodiments are included in the "detailed description of the invention" and the "drawings" attached hereto.

Advantages and features of the disclosed embodiments and methods of achieving the advantages and features will be clear with reference to various embodiments described in detail below together with the accompanying drawings.

However, it should be understood that the disclosed embodiments are not limited to the configuration of each of the embodiments disclosed below, but may also be implemented in a variety of other forms, and that each of the embodiments disclosed herein is provided only to make the disclosure of the disclosed embodiments complete and to fully inform those skilled in the art to which the disclosed embodiments belong of the scope of the disclosed embodiments, and that the disclosed embodiments are only defined by the scope of each claim of the appended claims.

According to the disclosed embodiments, it is possible to generate an answer sentence and an image summarizing and organizing numerous information associated with a user's search term using a pre-trained generative artificial intelligence model, and to generate and provide answer content including the generated sentence and image.

Therefore, it is possible to reduce the time spent on summarizing and organizing the vast amount of search information.

BRIEF DESCRIPTION OF THE DRAWINGS

FIGS. 4A and 4B are an exemplary view illustrating a layout of answer content generated according to the disclosed embodiment.

DETAILED DESCRIPTION OF THE INVENTION

Figure 1:
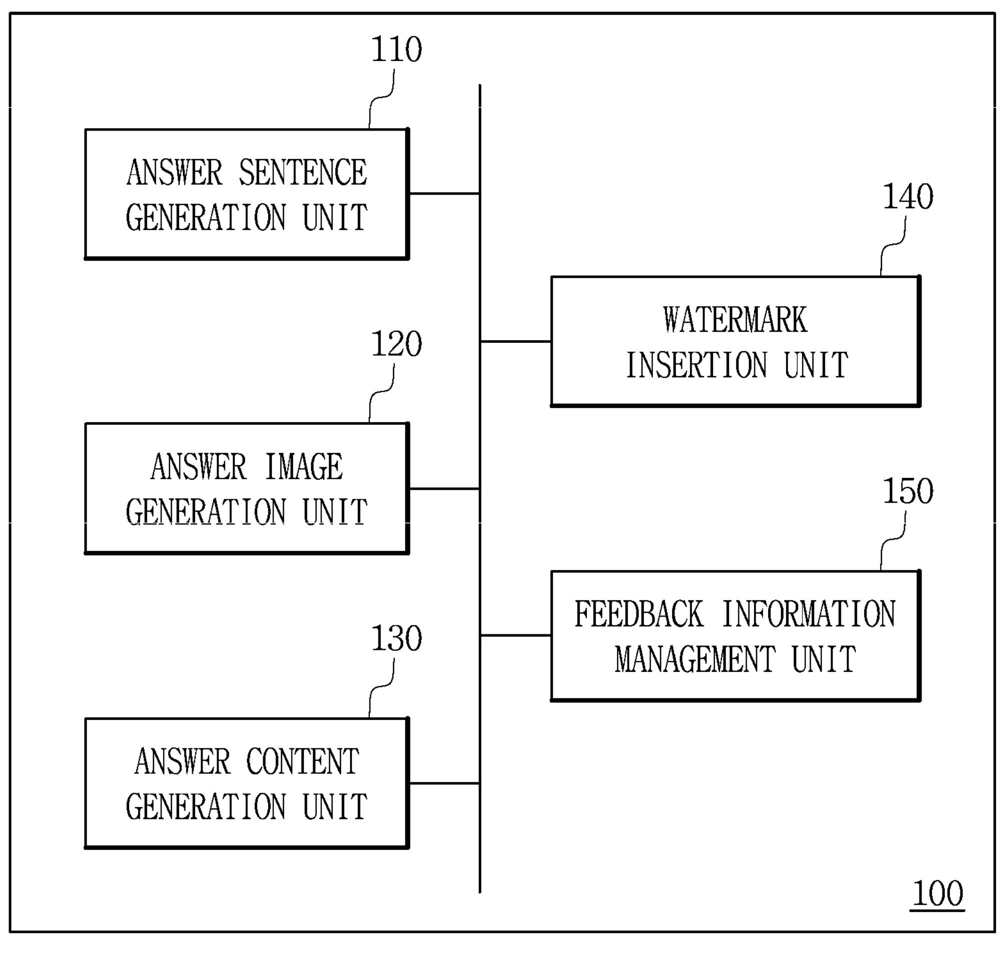
FIG. 1 is a block diagram for describing a module of an apparatus for summarizing information using a generative artificial intelligence model according to one embodiment.

It should be understood that before describing the disclosed embodiments in detail, the terms and words used in the present specification are not to be interpreted unconditionally and without limitation in the general or dictionary meaning, and that the inventor may appropriately define and use the concepts of various terms to best describe his/her own invention, and further that these terms and words are to be interpreted in a meaning and concept consistent with the technical spirit.

That is, it should be understood that the terms used in the present specification are used only to describe preferred embodiments and are not intended to specifically limit the content of the disclosed embodiments, and that these terms are terms defined in consideration of the various possibilities of the disclosed embodiments.

In addition, in the present specification, it should be understood that singular expressions may include plural expressions unless the context clearly indicates a different meaning, and similarly, the plural expressions may have a singular meaning.

Throughout the present specification, where a constituent element is described as "comprising/including" another element, which, unless specifically stated to the contrary, may mean to include any other constituent element and not to exclude any other constituent element.

Further, when a constituent element is described as "existing within, or being installed in connection with," another constituent element, it should be understood that the constituent element may be directly connected to, installed in contact with, or installed spaced a certain distance apart from another constituent element, and that in case of being installed spaced a certain distance apart, there may be a third constituent element or means for fixing or connecting the constituent element to another constituent element, and the description of the third constituent element or means may be omitted.

In contrast, when a constituent element is described as being "directly connected" or "directly accessed" to another constituent element, it should be understood that there is no third constituent element or means.

Similarly, other expressions that describe the relationship between respective constituent elements, such as "between" and "directly between", or "adjacent to" and "directly adjacent to", should be interpreted in the same manner.

In addition, it should be understood that when the terms "one surface," "the other surface," "one side," "the other side," "first," "second," and the like, are used in the present specification, they are used to refer to one constituent element so that this one constituent element can be clearly distinguished from other constituent elements, and that the meaning of the corresponding constituent element is not limited by such terms.

In addition, when the terms relating to a position, such as "top," "bottom," "left," "right," and the like, are used in the present specification, it should be understood that they refer to a relative position in the corresponding drawing with respect to the corresponding constituent element, and should not be understood that the terms relating to a position refer to an absolute position, unless the absolute position is specified with respect to the constituent element.

Further, it should be understood that in the present specification, the terms "unit," "device," "module," "apparatus," and the like, when used, mean a unit capable of performing one or more functions or operations, which may be implemented in hardware or software (e.g., a processor), or a combination of hardware and software.

In addition, in specifying the reference numeral for each constituent element in each drawing, the present specification is intended to indicate that the same constituent element has the same reference numeral even though it is illustrated in different drawings, i.e., the same reference numeral throughout the specification refers to the same constituent element.

In the drawings accompanying the present specification, the size, position, coupling relationships, etc. of each of the constituent elements constituting the disclosed embodiments may be exaggerated, reduced, or omitted in some respects in order to convey the spirit of the disclosed embodiments with sufficient clarity or for convenience of description, and thus the proportions or scales may not be strictly accurate.

In addition, in describing the disclosed embodiments below, detailed descriptions of the configuration, for example, of known art, including prior art, may be omitted where it is determined that such descriptions would unnecessarily obscure the subject matter of the disclosed embodiments.

Hereinafter, with reference to the accompanying drawings, an apparatus and method for summarizing information using a generative artificial intelligence model according to a preferred embodiment will be described in detail.

FIG. 1 is a view schematically illustrating a configuration of an apparatus for summarizing information using a generative artificial intelligence model, according to one embodiment.

As illustrated in FIG. 1, an apparatus 100 for summarizing information using a generative artificial intelligence model according to one embodiment may be configured to include an answer sentence generation unit 110, an answer image generation unit 120, an answer content generation unit 130, a watermark insertion unit 140, a feedback information management unit 150, and the like.

With this configuration, the answer sentence generation unit 110, upon a search term being input from a user, may generate an answer sentence summarizing and organizing a large number of information associated with the search term received from the user through a first generative artificial intelligence model pre-trained with a large amount of information existing on the Internet by a reinforcement learning method, and may generate the answer sentence of at least one sentence.

Here, as the search term input from the user, a search term comprising a word or a sentence may be input, and a search term including an image may be input.

The answer sentence generation unit 110 generates an answer sentence for the search term input from the user, and then provides the result to the user, and may receive feedback from the user on the result in conjunction with the feedback information management unit 150.

The feedback information management unit 150 may score the feedback received from the user on the answer sentence generated by the answer sentence generation unit 110, classify and store the scored feedback as a personal preference of the user, and enable the answer sentence generation unit 110 to reflect the personal preference in generating the next answer sentence.

When generating the answer sentence for the search term input from the user, the answer sentence generation unit 110 may, in conjunction with the feedback information management unit 150, generate the answer sentence by reflecting the feedback information on the answer sentence of the corresponding user when the feedback information on the answer sentence of the corresponding user exists.

The feedback information management unit 150 may receive itemized feedback on an average sentence length of the answer sentence, an overall length of the answer sentence, and the like generated by the answer sentence generation unit 110.

The first generative artificial intelligence model described above may be implemented on the basis of a natural language processing model. For example, the first generative artificial intelligence model may be implemented as Chat GPT, You Chat, bard, and the like, but is not limited thereto.

The answer image generation unit 120 may generate at least one answer image based on the search term or answer sentence through a pre-trained second generative artificial intelligence model. Here, the generated answer image may include a video.

Figure 2:
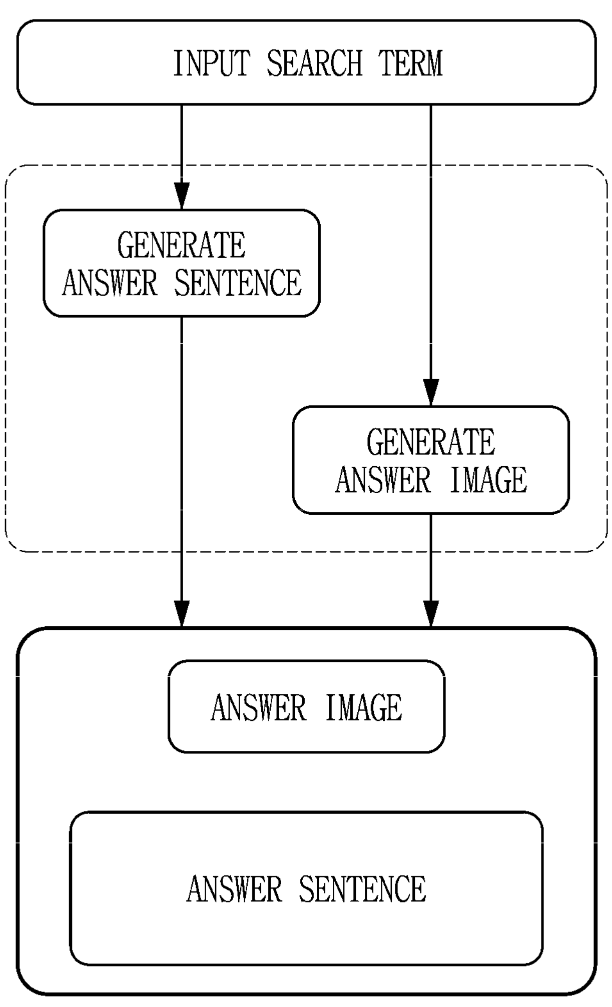
FIGS. 2 and 3 are exemplary views illustrating a generation sequence of answer sentences and answer images generated according to a disclosed embodiment.

The answer image generation unit 120 may generate an answer image based on the search term input from the user when the answer sentence generation unit 110 generates the answer sentence on the search term input from the user (parallel processing, see FIG. 2).

Figure 3:
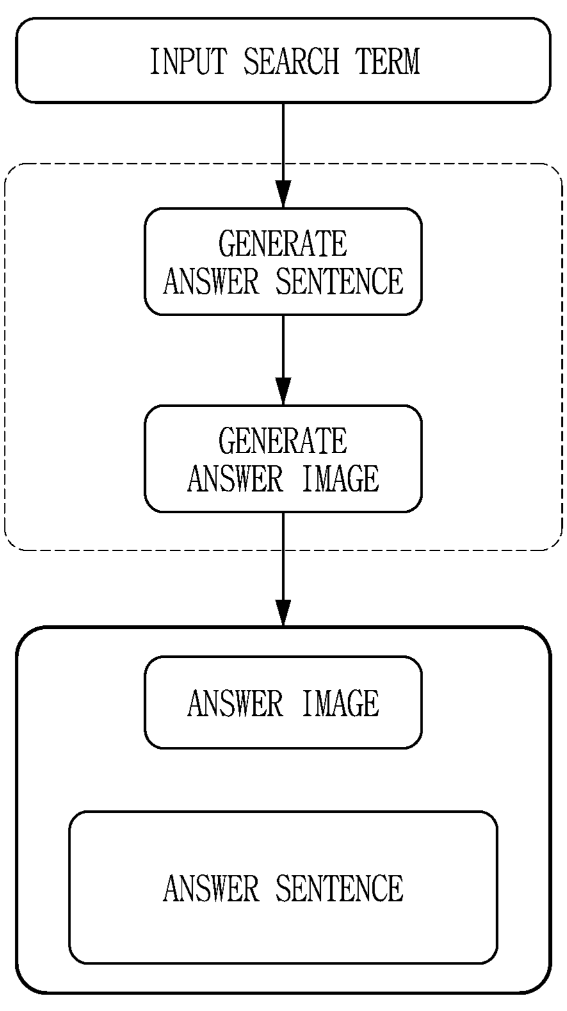

In addition, when the answer sentence generation unit 110 generates the answer sentence on the search term input from the user, the answer image generation unit 120 may generate an answer image based on the generated answer sentence (sequential processing, see FIG. 3).

The answer image generation unit 120 may generate the answer image based on the search term or answer sentence input from the user, and then provide the result to the user, and may receive feedback from the user on the result in conjunction with the feedback information management unit 150.

The feedback information management unit 150 may score the feedback received from the user on the answer image generated by the answer image generation unit 120, classify and store the scored feedback as a personal preference of the user, and enable the answer image generation unit 120 to reflect the personal preference in generating the next answer image.

When generating the answer image based on the search term or answer sentence input from the user, the answer image generation unit 120 may, in conjunction with the feedback information management unit 150, when feedback information on the answer image of the corresponding user exists, generate the answer image reflecting the feedback information on the answer image of the corresponding user.

The feedback information management unit 150 may receive itemized feedback on an angle, brightness, style representation, and the like of the answer image generated by the answer image generation unit 120.

The second generative artificial intelligence model described above may be implemented on the basis of a natural language processing model and an image generative model. For example, the second generative artificial intelligence model may be implemented as DALL-E, Midjourney, Stable Diffusion (SD), NovelAI Diffusion (NAI), and the like, but is not limited thereto.

The answer content generation unit 130 may generate answer content including the answer sentence generated by the answer sentence generation unit 110 and the answer image generated by the answer image generation unit 120 on the basis of the search term input from the user.

When generating the answer content, the answer content generation unit 130 may, when there are a plurality of answer images generated by the answer image generation unit 120, generate the answer content using an answer image selected from the user among the generated plurality of answer images.

Figures 4A, 4B:
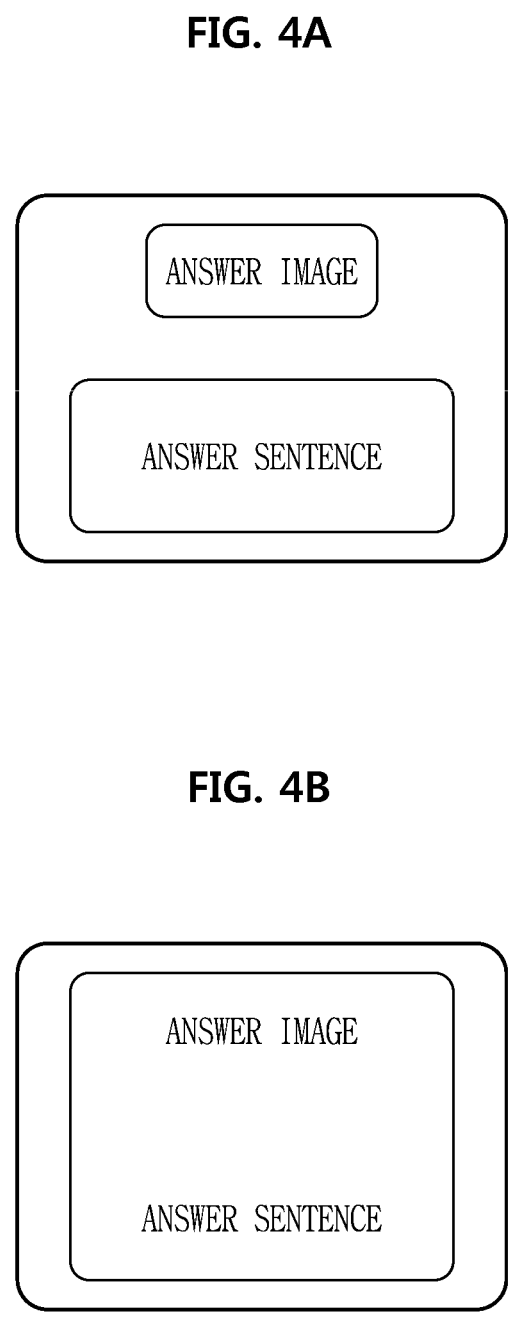

The answer content generation unit 130 may generate the answer content by combining the answer sentence generated by the answer sentence generation unit 110 and the answer image generated by the answer image generation unit 120 in various forms. For example, the answer sentence and answer image may be combined as a simple list (see FIG. 4A), the answer sentence may be combined with the answer image in a form in which the answer image is inserted between the answer sentence, and the answer sentence may be combined with the answer image in a form in which the answer sentence is inserted within the answer image (see FIG. 4B).

As described above, since the answer content generation unit 130 generates the answer content by combining the answer sentence and the answer image in various forms, the layout of the answer content may be implemented in various forms.

The answer content generation unit 130 may generate the answer content in a video format by combining the answer sentence and the answer image.

The answer content generation unit 130 may provide the answer content generated by combining the answer sentence and the answer image to the user, and receive feedback from the user on the resulting content in conjunction with the feedback information management unit 150.

The feedback information management unit 150 may score the feedback received from the user on the answer content generated by the answer content generation unit 130, classify and store the scored feedback as a personal preference of the user, and enable the answer content generation unit 130 to reflect the personal preference in generating the next answer content.

When generating the answer content, the answer content generation unit 130 may, in conjunction with the feedback information management unit 150, generate the answer sentence by reflecting the feedback information on the answer content of the corresponding user when the feedback information on the answer content of the corresponding user exists.

The feedback information management unit 150 may receive itemized feedback on a form, layout, length of the entire answer sentence, whether and where to insert a watermark, and the like of the answer content generated by the answer content generation unit 130.

The watermark insertion unit 140 may insert a watermark into the answer content generated by the answer content generation unit 130, indicating that the corresponding answer content was generated by the generative artificial intelligence model.

The watermark inserted into the answer content may be inserted in the form of an image, text, or information data, but is not limited thereto.

Figure 5A:
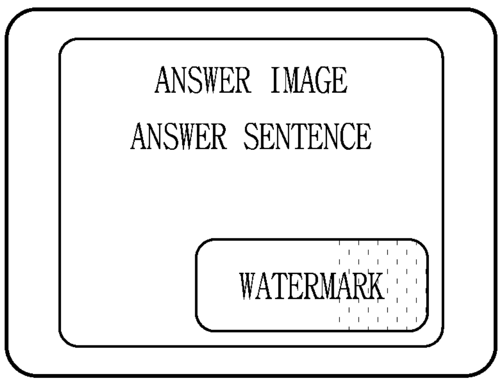
FIGS. 5A and 5B are an exemplary view illustrating a watermark that is inserted into answer content according to the disclosed embodiment.
Figure 5B:
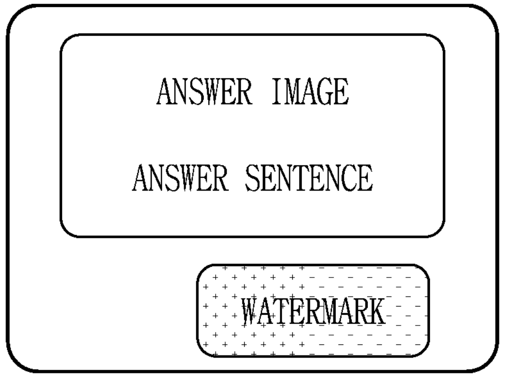

The watermark insertion unit 140 may generate a specific watermark indicating that the answer content generated by the answer content generation unit 130 was generated by the generative artificial intelligence model, and may insert the specific watermark to be disposed within the answer sentence or answer image that forms the answer content (see FIG. 5A), or may insert the specific watermark to be disposed in an external template of the answer content (see FIG. 5B).

In addition, the watermark insertion unit 140 may attach or logically couple the watermark to file information in the form of digital information (electronic signature).

The reason for inserting the watermark into the answer content generated by the answer content generation unit 130 is to prevent the content generated by the generative artificial intelligence model from being misused or used unethically.

The feedback information management unit 150 may manage feedback information for each user.

Specifically, the feedback information management unit 150 may score and store the feedback received from the user on the answer sentence generated by the answer sentence generation unit 110, score and store the feedback received from the user on the answer image generated by the answer image generation unit 120, and score and store the feedback received from the user on the answer content generated by the answer content generation unit 130.

As described above, the scored feedback information may be classified into the user's personal preferences and reflected in future generations.

That is, the answer sentence generation unit 110 may generate the answer sentence by reflecting the feedback information on the answer sentence of the corresponding user stored in the feedback information management unit 150 when generating the next answer sentence, the answer image generation unit 120 may generate the answer image by reflecting the feedback information on the answer image of the corresponding user stored in the feedback information management unit 150 when generating the next answer image, and the answer content generation unit 130 may generate the answer content by reflecting the feedback information on the answer content of the corresponding user stored in the feedback information management unit 150 when generating the next answer content.

Meanwhile, the feedback information management unit 150 may manage the feedback information for each user in synchronization with a search term pattern.

Specifically, the feedback information management unit 150 may classify the search term pattern of each user, convert the feedback information received from each user on the answer sentence generated by the answer sentence generation unit 110 into data and store the feedback information in synchronization with the search term pattern, convert the feedback information received from each user on the answer image generated by the answer image generation unit 120 into data and store the feedback information in synchronization with the search term pattern, convert the feedback information received from each user on the answer content generated by the answer content generation unit 130 into data and store the feedback information in synchronization with the search term pattern.

As described above, feedback information synchronized with search term patterns enables personalized answer content to be generated for a specific search term.

That is, the answer sentence generation unit 110 may generate the answer sentence by reflecting feedback information on an answer sentence that is synchronized to a search term pattern similar to the search term pattern input from the user when generating the answer sentence, the answer image generation unit 120 may generate the answer image by reflecting feedback information on an answer image that is synchronized to a search term pattern similar to the search term pattern input from the user when generating the answer image, and the answer content generation unit 130 may generate the answer content by reflecting feedback information on answer content that is synchronized to a search term pattern similar to the search term pattern input from the user when generating the answer content.

As described above, when the answer sentence generation unit 110, the answer image generation unit 120, and the answer content generation unit 130 generate the answer sentence, the answer image, and the answer content by reflecting the feedback information synchronized with the search term pattern, respectively, the feedback information may be recommended intermittently and randomly to be reflected in the generation of the answer sentence, the answer image, and the answer content.

This is to compensate for the problem in that each user continues to be provided with information that is generated only in a biased form of layout due to simple preferences.

Here, when the feedback information is recommended at random, it is possible to ensure the quality above a certain level because the feedback information managed for each user is recommended and reflected in the generation.

As described above, the feedback information for each user managed by the feedback information management unit 150 may be managed with encryption or by being clustered into a specific group.

Figure 6:
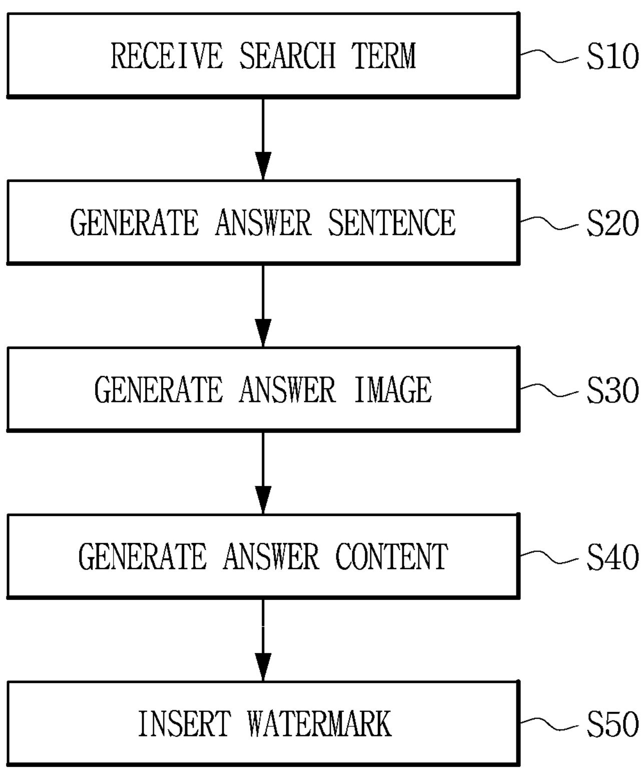
FIG. 6 is a processing diagram for describing a method of summarizing information using the generative artificial intelligence model according to one embodiment.

FIG. 6 is a processing diagram for describing a method of summarizing information using the generative artificial intelligence model according to one embodiment.

Since the method of summarizing information using a generative artificial intelligence model according to one embodiment proceeds on substantially the same configuration as the apparatus 100 for summarizing information using a generative artificial intelligence model illustrated in FIG. 1, the same numeral references are given to the same constituent elements as the apparatus 100 for summarizing information using a generative artificial intelligence model in FIG. 1, and repetitive descriptions are omitted.

First, when the search term is input from the user in step S10, in step S20, the answer sentence generation unit 110 may generate an answer sentence summarizing and organizing numerous information related to the search term input from the user through the first generative artificial intelligence model that is pre-trained with a vast amount of information existing on the Internet, and generate the answer sentence, which has at least one sentence.

The search term input from the user in step S10 above may be a search term including a word or a sentence, and may be a search term including an image.

In step S20 above, the answer sentence generation unit 110 may analyze the search term input from the user through the pre-trained first generative artificial intelligence model to generate at least one answer sentence, and then provide the result to the user, and receive feedback input from the user on the result in conjunction with the feedback information management unit 150.

The feedback information management unit 150, which receives feedback from the user on the answer sentence generated by the answer sentence generation unit 110 in step S20 above, may score the feedback received from the user, and classify the scored feedback as a personal preference of the user so that the answer sentence generation unit 110 reflects the personal preference in generating the next answer sentence.

In step S20 above, the feedback information management unit 150 may receive itemized feedback from the user on an average sentence length of the answer sentence, an overall length of the answer sentence, and the like generated by the answer sentence generation unit 110.

In step S20 above, when generating the answer sentence, the answer sentence generation unit 110 may, in conjunction with the feedback information management unit 150, generate the answer sentence by reflecting the feedback information on the answer sentence of the corresponding user when the feedback information on the answer sentence of the corresponding user exists.

Then, in step S30, the answer image generation unit 120 may generate at least one answer image based on the search term or answer sentence through the pre-trained second generative artificial intelligence model.

In step S30 above, the answer image generation unit 120 may generate the answer image based on the search term or answer sentence input from the user, and then provide the result to the user, and may receive feedback from the user on the result in conjunction with the feedback information management unit 150.

In step S30 above, the feedback information management unit 150 may score the feedback received from the user on the answer image generated by the answer image generation unit 120, classify the scored feedback as a personal preference of the user, and enable the answer image generation unit 120 to reflect the personal preference in generating the next answer image.

In step S30 above, the feedback information management unit 150 may receive itemized feedback on an angle, brightness, style representation, and the like of the answer image generated by the answer image generation unit 120.

In step S30 above, when generating the answer image, the answer image generation unit 120 may, in conjunction with the feedback information management unit 150, generate the answer image by reflecting the feedback information on the answer image of the corresponding user when the feedback information on the answer image of the corresponding user exists.

When the answer sentence is generated through step S20 above and the answer image is generated through step S30 above, in step S40, the answer content generation unit 130 may generate answer content that includes the answer sentence generated through step S20 above and the answer image generated through step S30 above.

In step S40 above, the answer content generation unit 130 may provide the answer content generated by combining the answer sentence and the answer image to the user, and receive feedback from the user on the resulting content in conjunction with the feedback information management unit 150.

In step S40 above, the feedback information management unit 150 may score the feedback received from the user on the answer content generated by the answer content generation unit 130, classify the scored feedback as a personal preference of the user, and enable the answer content generation unit 130 to reflect the personal preference in generating the next answer content.

In step S40 above, when generating the answer content, the answer content generation unit 130 may, in conjunction with the feedback information management unit 150, generate the answer content by reflecting the feedback information on the answer content of the corresponding user when the feedback information on the answer content of the corresponding user exists.

In step S50 above, the watermark insertion unit 140 may, through step S40 above, insert a watermark into the answer content generated by the answer content generation unit 130, indicating that the corresponding answer content was generated by the generative artificial intelligence model.

In step S50 above, the watermark insertion unit 140 may generate a specific watermark indicating that the answer content generated by the answer content generation unit 130 was generated by the generative artificial intelligence model, and may insert the specific watermark to be disposed within the answer sentence or answer image that forms the answer content (see FIG. 5A), or may insert the specific watermark to be disposed in an external template of the answer content (see FIG. 5B).

In addition, in step S50 above, the watermark insertion unit 140 may attach or logically couple the watermark to file information in the form of digital information (electronic signature).

In the disclosed embodiment, the feedback on the answer image generated by the answer image generation unit 120 is implemented to be received after the answer image is generated in step S30 above, but the feedback may be implemented to be received after the answer content is generated in step S40 above.

In addition, in the disclosed embodiment, the feedback on the answer content is implemented to be received before the watermark is inserted, but the feedback may be implemented to be received after the watermark is inserted.

Figure 7:
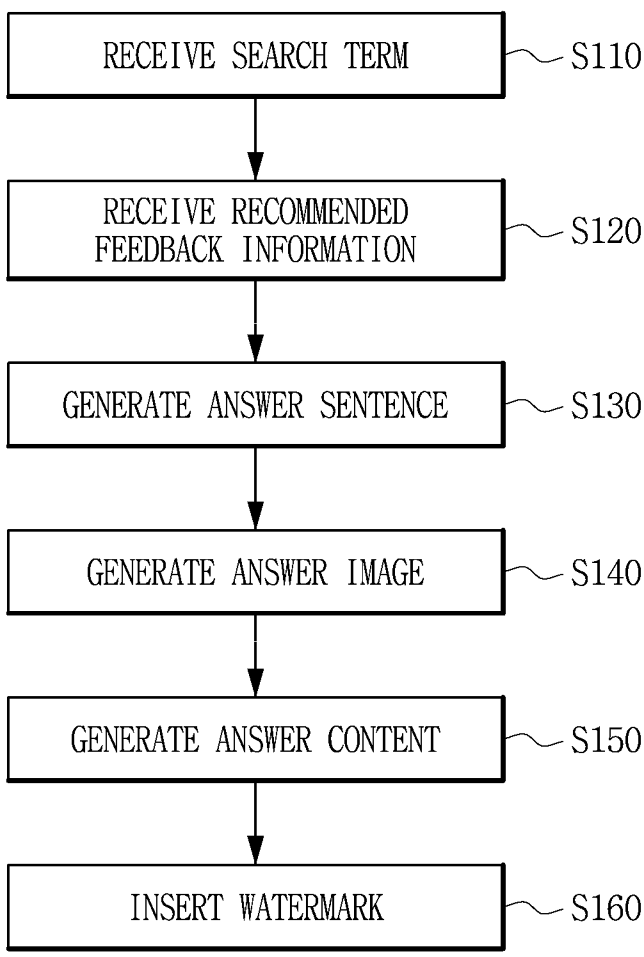
FIG. 7 is a processing diagram for describing a method for summarizing information using a generative artificial intelligence model according to another embodiment.

FIG. 7 is a processing diagram for describing a method for summarizing information using a generative artificial intelligence model according to another embodiment.

Since a method of summarizing information using a generative artificial intelligence model according to another embodiment, similar to the method of summarizing information using a generative artificial intelligence model according to one embodiment, also proceeds on substantially the same configuration as the apparatus 100 for summarizing information using a generative artificial intelligence model illustrated in FIG. 1, the same numeral references are given to the same constituent elements as the apparatus 100 for summarizing information using a generative artificial intelligence model in FIG. 1, and repetitive descriptions are omitted.

First, upon receiving the search term input from the user in step S110, the feedback information management unit 150 analyzes the search term pattern input from the user in step S120, and recommends one of plurality of feedback information synchronized to a search term pattern similar to the search term pattern input from the user.

In step S120 above, the feedback information management unit 150 may randomly and intermittently recommend the feedback information. Specifically, the feedback information management unit 150 may intermittently recommend random feedback information, rather than the feedback information synchronized to the search term pattern input from the user.

Then, in step S130, the answer sentence generation unit 110 may generate an answer sentence, which has at least one sentence, summarizing and organizing numerous information related to the search term input from the user through the first generative artificial intelligence model that is pre-trained with a vast amount of information existing on the Internet, and generate the answer sentence based on the feedback information recommended in step S120 above.

In step S130 above, the answer sentence generation unit 110 may generate the answer sentence for the search term input from the user through the pre-trained first generative artificial intelligence model, and then provide the result to the user, and receive feedback input from the user on the result in conjunction with the feedback information management unit 150.

The feedback information management unit 150, which receives feedback from the user on the answer sentence generated by the answer sentence generation unit 110 in step S130 above, may score the feedback received from the user, and store the scored feedback information in synchronization with the search term pattern.

Then, in step S140, the answer image generation unit 120 may generate at least one answer image based on the search term or answer sentence through the pre-trained second generative artificial intelligence model, and based on the feedback information recommended in step S120 above.

In step S140 above, the answer image generation unit 120 may generate the answer image based on the search term or answer sentence input from the user, and then provide the result to the user, and may receive feedback from the user on the result in conjunction with the feedback information management unit 150.

The feedback information management unit 150, which receives feedback from the user on the answer image generated by the answer image generation unit 120 in step S140 above, may score the feedback received from the user, and store the scored feedback information in synchronization with the search term pattern.

Then, in step S150, the answer content generation unit 130 may generate the answer content including the answer sentence generated through step S130 above and the answer image generated through step S140 above, but may generate the answer image based on the feedback information recommended in step S120 above.

In step S150 above, the answer content generation unit 130 may provide the answer content generated by combining the answer sentence and the answer image to the user, and receive feedback from the user on the resulting content in conjunction with the feedback information management unit 150.

The feedback information management unit 150, which receives feedback from the user on the answer content generated by the answer content generation unit 130 in step S150 above, may score the feedback received from the user, and store the scored feedback information in synchronization with the search term pattern.

In step S160 above, the watermark insertion unit 140 may, through step S150 above, insert a watermark into the answer content generated by the answer content generation unit 130, indicating that the corresponding answer content was generated by the generative artificial intelligence model.

The method of summarizing information using a generative artificial intelligence model according to the disclosed embodiment, may be implemented as an application or in the form of program instructions that may be executed through various computer components and recorded on a computer-readable recording medium. The computer-readable recording medium may include program instructions, data files, data structures, or the like, in a stand-alone form or in a combination thereof.

The program instructions recorded in the computer-readable recoding medium may be designed and configured specifically for the disclosed embodiments or may be publicly known and available to those skilled in the field of computer software.

Examples of the computer-readable recording medium may include magnetic media, such as a hard disk, a floppy disk and a magnetic tape, optical media, such as CD-ROM and DVD, magneto-optical media, such as a floptical disk, and hardware devices, such as ROM, RAM and flash memory, which are specifically configured to store and run program instructions.

Examples of the program instructions include machine codes made by a compiler, as well as high-language codes that may be executed by a computer, using an interpreter.

As described above, according to the disclosed embodiment, it is possible to generate an answer sentence and an image summarizing and organizing numerous information associated with a user's search term using a generative artificial intelligence model pre-trained on a vast amount of information on the Internet, and to generate and provide answer content with the generated sentence and image.

Therefore, it is possible to reduce the time spent on summarizing and organizing the vast amount of search information.

While the description above describes various preferred embodiments with some examples, it should be understood that the description of the various embodiments described in this "detailed description of the invention" section is merely illustrative, and those skilled in the art to which the disclosed embodiments belong can modify the disclosed embodiments from the above description to perform various other embodiments, or to perform embodiments equivalent to the disclosed embodiments.

In addition, it should be understood that the disclosed embodiments are not limited by the description above, as the disclosed embodiments may be implemented in a variety of other forms, and that the above description is provided only to make the disclosure complete and to inform those skilled in the art to which the disclosed embodiments belong of the scope of the disclosed embodiments, and that the disclosed embodiments are only defined by the respective claims of the claims.

What is claimed is:

1. An apparatus for summarizing information using a generative artificial intelligence model, the apparatus comprising:

one or more processors; and a memory provided for storing instructions executed by the one or more processors, wherein the one or more processors are configured to:

generate an answer sentence on a search term input from a user, using a first generative artificial intelligence model pre-trained to summarize and organize information that the user desires on the basis of information existing on the Internet;

generate an answer image based on at least one of the search term or the answer sentence using a second generative artificial intelligence model pre-trained to generate an image corresponding to an input sentence;

generate answer content including the answer sentence and the answer image;

receive, from the user, a feedback on the answer sentence, a feedback on the answer image, and a feedback on the answer content, separately;

store feedback information on a per-user basis, wherein the feedback information includes the feedback on the answer sentence, the feedback on the answer image, and the feedback on the answer content;

generate a new answer sentence by reflecting the feedback on the answer sentence;

generate a new answer image by reflecting the feedback on the answer image; and generate a new answer content by reflecting the feedback on the answer content.

2. The apparatus of claim 1, wherein the one or more processors are configured to score the feedback information, classify the scored feedback as a personal preference of the user, and reflect the scored feedback in generating at least one of the answer sentence, the answer image, or the answer content.

3. The apparatus of claim 1, wherein the one or more processors are configured to manage the feedback information in synchronization with a search term pattern of the user.

4. The apparatus of claim 3, wherein the one or more processors are configured to recommend one of plurality of pre-stored feedback information synchronized with a search term pattern similar to the search term pattern of the user.

5. The apparatus of claim 1, wherein the one or more processors are configured to insert a watermark into the answer content indicating that the answer content was generated by the first generative artificial intelligence model and/or the second generative artificial intelligence model.

6. A method of summarizing information using a generative artificial intelligence model performed by an apparatus provided with one or more processors, and a memory storing instructions executed by the one or more processors, the method comprising:

generating an answer sentence on a search term input from a user, using a first generative artificial intelligence model pre-trained to summarize and organize information that the user desires on the basis of information existing on the Internet;

generating an answer image based on at least one of the search term or the answer sentence using a second generative artificial intelligence model pre-trained to generate an image corresponding to an input sentence; and generating answer content including the answer sentence and the answer image;

receiving, from the user, a feedback on the answer sentence, a feedback on the answer image, and a feedback on the answer content, separately;

storing feedback information on a per-user basis, wherein the feedback information includes the feedback on the answer sentence, the feedback on the answer image, and the feedback on the answer content;

generating a new answer sentence by reflecting the feedback on the answer sentence;

generating a new answer image by reflecting the feedback on the answer image; and generating a new answer content by reflecting the feedback on the answer content.

7. The method of claim 6, wherein the method further comprises managing of the feedback information performed before receiving the feedback information, and the managing of the feedback information comprises:

scoring the feedback information and classifying and storing the scored feedback as a personal preference of the user; and reflecting the scored feedback in generating at least one of the answer sentence, the answer image, or the answer content.

8. The method of claim 7, wherein the managing of the feedback information comprises managing the feedback information in synchronization with a search term pattern of the user.

9. The method of claim 8, further comprising:

recommending one of a plurality of pre-stored feedback information synchronized to a search term pattern similar to the search term pattern of the user, wherein the generating an answer sentence, the generating answer image, and the generating an answer content generates the answer sentence, the answer image and the answer content based on the recommended feedback information, respectively.

10. The method of claim 6, further comprising:

inserting a watermark indicating that the answer content was generated by the first generative artificial intelligence model and/or the second generative artificial intelligence model.

11. A non-transitory computer-readable recording medium on which a computer program is recorded for performing the method of summarizing information using a generative artificial intelligence model according to claim 6.

* * * * *